United States Patent
Aubourg

(10) Patent No.: US 8,423,268 B2
(45) Date of Patent: Apr. 16, 2013

(54) DEVICE FOR CONTROLLING THE OPERATION OF AN INTERNAL COMBUSTION ENGINE, WITH IMPROVED REPHASING OF INJECTION EVENTS

(75) Inventor: Alain Aubourg, Saint Jean (FR)

(73) Assignee: Continental Automotive France, Toulouse (FR)

( * ) Notice: Subject to any disclaimer, the term of this patent is extended or adjusted under 35 U.S.C. 154(b) by 498 days.

(21) Appl. No.: 12/810,325

(22) PCT Filed: Dec. 15, 2008

(86) PCT No.: PCT/EP2008/010332
§ 371 (c)(1),
(2), (4) Date: Jun. 24, 2010

(87) PCT Pub. No.: WO2009/086871
PCT Pub. Date: Jul. 16, 2009

(65) Prior Publication Data
US 2010/0280744 A1    Nov. 4, 2010

(30) Foreign Application Priority Data
Jan. 9, 2008    (FR) ...................................... 08 00109

(51) Int. Cl.
G06F 19/00    (2011.01)
F02D 41/30    (2006.01)
F02M 51/00    (2006.01)

(52) U.S. Cl.
USPC ............................ 701/105; 701/114; 123/480

(58) Field of Classification Search .................. 123/295, 123/299, 300, 302, 304, 305, 431, 478, 480, 123/486; 701/102–105, 110, 113, 114
See application file for complete search history.

(56) References Cited

U.S. PATENT DOCUMENTS

| 5,390,641 | A | 2/1995 | Yamada et al. | |
|---|---|---|---|---|
| 5,934,259 | A | 8/1999 | Onishi | |
| 6,218,799 | B1 | 4/2001 | Hori | |
| 6,382,188 | B2 * | 5/2002 | Hasegawa et al. | 123/491 |
| 6,513,488 | B2 * | 2/2003 | Enoki et al. | 123/305 |
| 7,027,910 | B1 * | 4/2006 | Javaherian et al. | 701/111 |
| 7,783,412 | B2 * | 8/2010 | Poignant et al. | 701/105 |
| 2006/0217872 | A1 * | 9/2006 | Moriya et al. | 701/114 |
| 2007/0044770 | A1 | 3/2007 | Tetsuka | |

FOREIGN PATENT DOCUMENTS

| EP | 1 284 353 | 2/2003 |
|---|---|---|
| FR | 2 911 919 | 8/2008 |
| FR | 2 916 807 | 12/2008 |

OTHER PUBLICATIONS

International Search Report dated Jan. 16, 2009, from corresponding PCT application.

* cited by examiner

Primary Examiner — Willis R Wolfe, Jr.
(74) Attorney, Agent, or Firm — Young & Thompson

(57) ABSTRACT

A device (D) is dedicated to controlling the operation of an internal combustion engine (M) including at least two cylinders (Ci), each equipped with at least one inlet valve (SA) and at least one injector (IJ), and of the so-called indirect and sequential fuel injection type. This device (D) includes detection elements (MD) designed to detect an injection event phasing error relative to reference angular positions specific to the various cylinders (Ci), and control elements (MC) designed to rephase, if a phasing error of a cylinder (Ci) is detected, the command to open the injector (IJ) of this cylinder (Ci) after closure of the inlet valve (SA).

11 Claims, 2 Drawing Sheets

Figure 1:
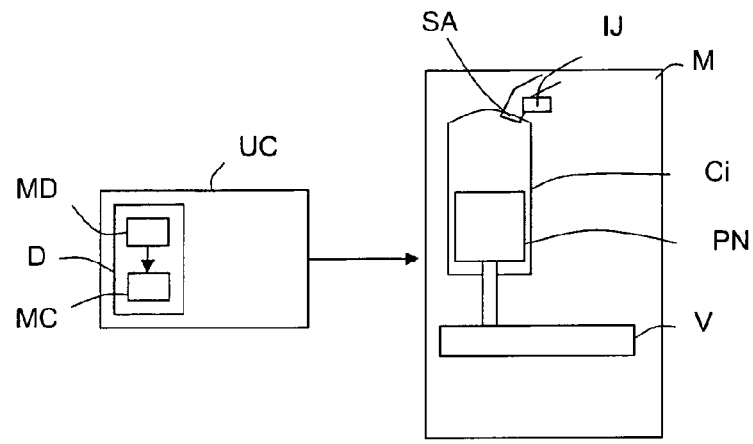

DEVICE FOR CONTROLLING THE OPERATION OF AN INTERNAL COMBUSTION ENGINE, WITH IMPROVED REPHASING OF INJECTION EVENTS

The invention relates to the control of the operation of an internal combustion engine, and more specifically the rephasing of injection events of an engine if a phasing error is detected.

The invention relates more particularly to internal combustion engines with a four-stroke cycle, and of the so-called indirect and sequential fuel injection type (that is to say comprising at least one injector for each cylinder upstream of an inlet valve, said injector being opened at least once per engine cycle), and without a foolproofing system between the two revolutions of an engine cycle (that is to say, for example, in the absence of a camshaft position sensor).

The expression "injection event" should be understood here to mean the opening of an injector.

As known by those skilled in the art, some engines of the abovementioned type include an engine control device comprising detection means designed to detect, once they are in operation, injection event phasing errors relative to reference angular positions of the crankshaft, specific to their various cylinders, and control means designed to rephase injection events if a phasing error is detected. The rephasing (or resynchronization) consists in shifting an injection event by one revolution (or 360° of the crankshaft) in an engine cycle.

During the rephasing transition, it is essential to check that each cylinder receives, in each engine cycle, a quantity of fuel that is necessary for correct combustion. Precautions must in fact be taken because the air-fuel mixture is admitted into a cylinder only while its inlet valve or valves is or are open, that is to say during approximately a quarter of the complete engine cycle, and therefore the quantity of fuel admitted into the cylinder depends on the total open time of the injector between two openings of the inlet valve or valves.

At least two solutions have been proposed to control the rephasing of the injection events if a phasing error or phasing errors is or are detected. A first solution consists in systematically starting up the engine by commanding the injectors once per engine revolution by injecting, each time an injector is opened, half the quantity of fuel needed for combustion, then in switching to one injection per engine cycle with the correct injection phasing as soon as a foolproofing means, with the engine running, is able to differentiate the two engine revolutions of an engine cycle.

A second solution consists in systematically starting up the engine by commanding the injectors once per engine cycle, then, as soon as a phasing error is detected, in progressively shifting the injection events by a few degrees on each engine cycle until a total shift of 360° is obtained.

Since no known solution is entirely satisfactory, the aim of the invention is to improve the situation.

To this end, the invention provides a device dedicated to controlling the operation of an internal combustion engine (of the type described in the introductory part), and comprising detection means designed to detect injection event phasing errors relative to reference angular positions specific to the various cylinders, and control means designed to rephase injection events if phasing errors are detected.

This device is characterized by the fact that its control means are designed to rephase in a single operation, if a cylinder phasing error is detected, the command to open the injector of this cylinder after closure of the inlet valve.

The control device according to the invention may include other features which can be taken separately or in combination, and in particular:

its control means may be designed to determine a new reference angular position for a cylinder and set up this new reference angular position when the previous reference angular position of the cylinder is passed by 360°. The newly set-up reference angular position then defines the start of a new engine cycle and serves as a reference for phasing the command to open the injector in this new cycle;

its control means may be designed to set up the new reference angular positions cylinder after cylinder;

its control means may be designed to stop the opening of the injector of a cylinder when this opening occurs while the new reference angular position of the cylinder is being set up;

its control means may be designed to generate a new reference angular position of a cylinder every 720° after the setting-up of its new reference angular position and after the rephasing of at least one its injection events relative to the latter;

its control means may be designed, during an engine start-up phase, to command the opening of each injector once per engine cycle.

The invention also relates to an engine control unit, or ECU, comprising a control device of the type of that described hereinabove.

Figure 2:
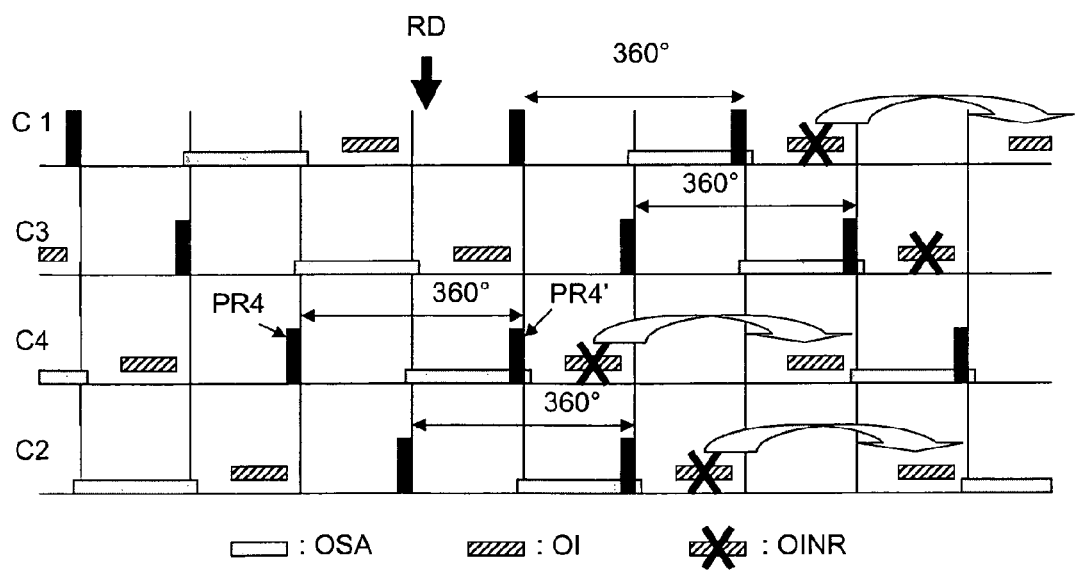
Figure 3:
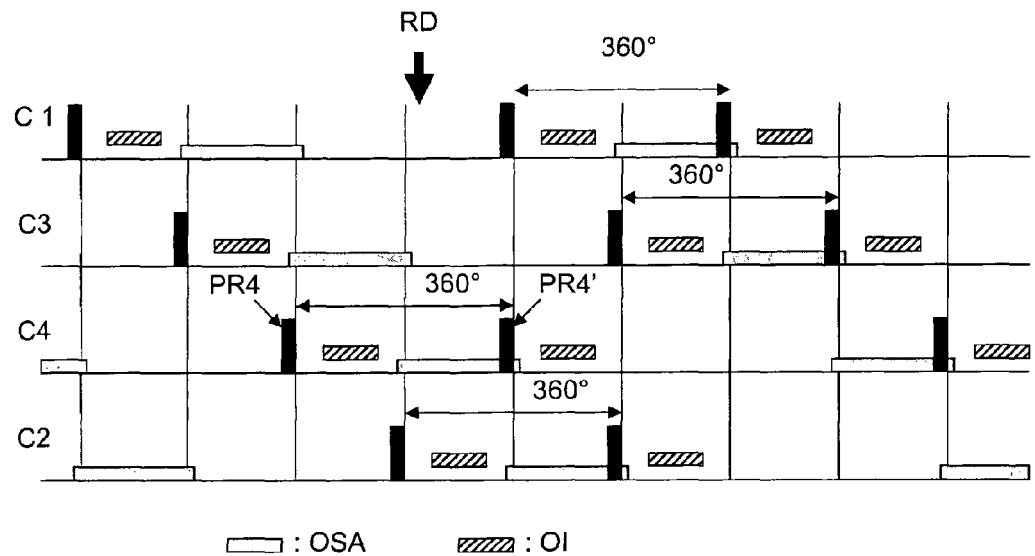
Figure 4:
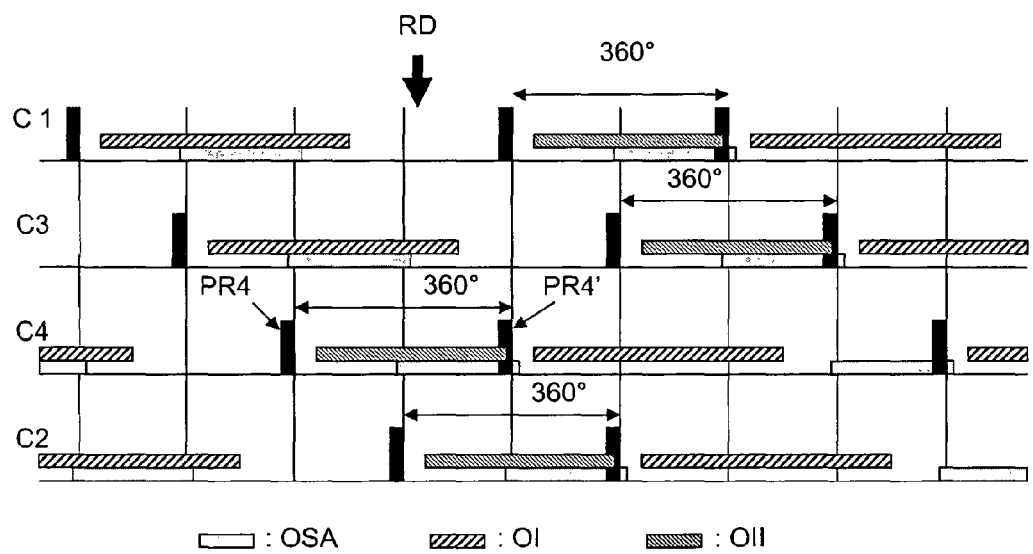

Other features and advantages of the invention will become apparent on studying the detailed description below, and the appended drawings, in which:

FIG. 1 very schematically and functionally illustrates a part of an engine coupled to an engine control unit equipped with a control device according to the invention, FIG. 2 schematically illustrates a first example of timing diagrams for events occurring in the four cylinders of an engine in the presence of a short injection time and a phasing error on start-up associated with an injection start angle less than 360°, FIG. 3 schematically illustrates a second example of timing diagrams for events occurring in the four cylinders of an engine in the presence of a short injection time and a phasing error on start-up associated with an injection start angle greater than 360°, FIG. 4 schematically illustrates a third example of timing diagrams for events occurring in the four cylinders of an engine in the presence of a long injection time and a phasing error on start-up.

The appended drawings are able not only to complement the invention, but also to contribute to its definition, as appropriate.

The object of the invention is to allow the rephasing of injection events of an internal combustion engine (of the type described in the introductory part) if phasing errors are detected.

Hereinbelow it is assumed by way of nonlimiting example that the internal combustion engine is part of a motor vehicle. However, the invention is not limited to this type of application.

As is illustrated in FIG. 1, an engine (four-stroke internal combustion engine, with indirect and sequential fuel injection) M comprises in particular at least two cylinders Ci, in each of which moves a piston PN connected to a crankshaft V and each of which comprises at least one inlet valve SA and an injector IJ which are controlled by a control device D according to the invention.

In the nonlimiting exemplary embodiment illustrated in FIG. 1, the device D forms part of an engine control unit (or ECU) UC designed to determine and deliver setting (or operating) parameter values of the engine M according to instructions and/or setpoints and parameters representative of the current operation of the engine M.

As is schematically and functionally illustrated in FIG. 1, the device D essentially comprises a detection module MD and a control module MC that are coupled together.

The detection module MD is designed to detect an injection phasing error. This phasing error detection relies on the analysis of signals obtained from the operation of the engine, these signals being characteristic of a suitable phasing at predetermined instants. Reference can be made to the French patent applications FR 07 03 953, FR 07 03 954, FR 07 03 956 or FR 07 03 957 filed by the Applicant for information.

Hereinbelow, it is assumed in a nonlimiting manner that the reference angular position of the crankshaft V, for a given cylinder $C_i$, corresponds to the 0° angle of the engine cycle. When the phasing is correct, this reference angular position of a cylinder corresponds more or less to what those skilled in the art call the bottom dead center of the piston PN of this cylinder $C_i$, at the end of the air intake stroke. Each cylinder has its own unique reference angular position of the crankshaft V in order to apply the desired opening angles for its injector IJ, this reference angular position being defined by the control device D every 720° of the crankshaft (i.e once per engine cycle).

The control module MC is designed, as indicated hereinabove, to define the reference angular position of the crankshaft V for each cylinder $C_i$, and to rephase injection events (opening(s) of the injector IJ) when the detection module MD detects a phasing error.

More specifically, when the detection module MD detects a phasing error on a cylinder $C_i$ (with the engine running), the control module MC rephases the command to open the injector IJ and/or the inlet valve SA of this cylinder $C_i$ once this inlet valve SA has been closed.

The expression "rephasing a command to open an injector" should be understood here to mean the act of phasing the command to open an injector relative to a new reference angular position.

Since the rephasing of the injection begins when the inlet valve SA closes, the transition (rephasing or resynchronization) can then be virtually instantaneous with no risk of any drift in richness.

Preferentially, the control module MC determines a new reference angular position for each cylinder $C_i$, one cylinder after the other, once for each cylinder, as soon as the preceding, and therefore incorrect, reference angular position of this cylinder $C_i$ is passed by exactly 360° (instead of 720°). This newly set-up reference angular position then defines the start of a new engine cycle. Furthermore, it serves as a time reference for phasing the command to open the injector IJ of the cylinder $C_i$ in the new cycle, that is to say to correctly align in time the start of opening of the injector relative to the start of the new cycle.

The control module MC preferentially proceeds with the setting-up of the new reference angular positions in the order of ignition of the cylinders. In other words, the new position of the first cylinder C1 is set up, then that of the third cylinder C3, then that of the fourth cylinder C4 and finally that of the second cylinder C2, for example for an engine M comprising four cylinders and for which the ignition sequence of the cylinder $C_i$ is "1-3-4-2".

Moreover, the control module MC is preferentially arranged so as to stop the opening of the injector IJ of a cylinder $C_i$ when this opening occurs during the set-up phase of the new reference angular position of this cylinder $C_i$.

It will be noted that once the control module MC has defined the new reference angular position of a cylinder $C_i$ and rephased an injection event of this cylinder $C_i$ relative to this new reference angular position, it reverts to a standard operating mode consisting in generating a new reference angular position of the cylinder $C_i$ every 720° (i.e once per engine cycle).

It will also be noted that, in order to reduce the pollutant emissions in each start-up phase, the control module MC can command one or more openings of each injector IJ on the basis of an engine cycle, by injecting the total quantity of fuel, rather than commanding one or more openings of each injector IJ on the basis of the engine revolution, by injecting half the total quantity of fuel.

Reference is now made to FIG. 2 in order to describe a first example of rephasing of injection events of an engine with four cylinders $C_i$, when the injection is of short duration and when a phasing error on start-up, associated with an injection start angle greater than 360° on each cylinder $C_i$, has been detected by the detection module MD. This concerns an error of alignment of the start of the opening of the injectors IJ. In this FIG. 2, a shaded rectangle (OSA) represents the open time of the inlet valve SA of a cylinder $C_i$, a rectangle cross-hatched from left to right (OI) represents the open time of the injector IJ of a cylinder $C_i$, and a rectangle cross-hatched from left to right and with a cross through it (OINR) represents an opening of the injector IJ of a cylinder $C_i$ not having taken place.

In this first example, the resynchronization (or rephasing) is requested at an instant RD at which the inlet valve SA of the fourth cylinder C4 is open. The control module MC therefore determines a new reference angular position PR4' for the fourth cylinder C4, then sets up this new reference angular position PR4' 360° after the preceding reference angular position PR4 of this fourth cylinder C4. Because of this new reference angular position PR4', the open phase of the inlet valve SA is correctly placed in the fourth quarter of the new cycle, but the temporal position of the injector IJ scheduled until then is not correct. Consequently, the control module MC prevents the open phase of the injector IJ of the fourth cylinder C4 from taking place in the first quarter scheduled until then and correctly realigns time-wise (that is to say, in the third quarter of the new cycle) the start of the opening of this injector IJ relative to the start of this new cycle defined by the new reference angular position PR4'. Next, the control module MC does the same for the second cylinder C2, then for the first cylinder C1 and finally for the third cylinder C3.

Reference is now made to FIG. 3 in order to describe a second example of rephasing of injection events of an engine with four cylinders $C_i$, when the injection is of short duration and when a phasing error on start-up, associated with an injection start angle less 360° on each cylinder $C_i$, has been detected by the detection module MD. In this FIG. 3, a shaded rectangle (OSA) represents the open time of the inlet valve SA of a cylinder $C_i$, and a rectangle cross-hatched from left to right (OI) represents the open time of the injector IJ of a cylinder $C_i$.

In this second example, the resynchronization (or rephasing) is requested at an instant RD at which the inlet valve SA of the fourth cylinder C4 is open. The control module MC therefore determines a new reference angular position PR4' for the fourth cylinder C4, then sets up this new reference angular position PR4' 360° after the preceding reference angular position PR4 of this fourth cylinder C4. Because of this new reference angular position PR4', the temporal position of the injector IJ scheduled until then is not correct. Consequently, the control module MC correctly realigns time-wise (that is to say in the fourth quarter of the new cycle) the start of opening of the injector IJ of the fourth cylinder C4 relative to the start of this new cycle defined by the new reference angular position PR4'. Next, the control module MC does the same for the second cylinder C2, then for the first cylinder C1 and finally for the third cylinder C3.

Reference is now made to FIG. 4 in order to describe a third example of rephasing of injection events of an engine with four cylinders Ci when the injection is of long duration and when a phasing error on start-up has been detected by the detection module MD. This concerns an error in the alignment of the start of the opening of the injectors IJ. In this FIG. 4, a shaded rectangle (OSA) represents the open time of the inlet valve SA of a cylinder Ci, a rectangle cross-hatched from left to right (OI) represents the open time of the injector IJ of a cylinder Ci, and a rectangle cross-hatched from right to left (OII) represents an opening that has been stopped of an injector IJ of a cylinder Ci.

In this third example, the resynchronization (or rephasing) is requested at an instant RD at which the injector IJ and the inlet valve SA of the fourth cylinder C4 are open. The control module MC therefore determines a new reference angular position PR4' for the fourth cylinder C4, then sets up this new reference angular position PR4' 360° after the preceding reference angular position PR4 of this fourth cylinder C4. The set-up phase for the new reference angular position PR4' of the fourth cylinder C4 takes place while its injector IJ is open, so the control module MC stops this opening phase, which means that the temporal position of the injector IJ scheduled until then is not correct. Moreover, because of the new reference angular position PR4' the open phase of the inlet valve SA is correctly placed in the fourth quarter of the new cycle. Consequently, the control module MC correctly realigns time-wise (that is to say in the first quarter of the new cycle) the start of opening of the injector IJ of the fourth cylinder C4 relative to the start of this new cycle defined by the new reference angular position PR4'. Next, the control module MC does the same for the second cylinder C2, then for the first cylinder C1 and finally for the third cylinder C3.

The control module MC and the detection module MD are preferentially produced in the form of software (or computer) modules. However, they can also be produced in the form of electronic circuits or a combination of electronic circuits and software.

The invention makes it possible to combine the advantages offered by each of the two solutions from the prior art, namely a reduction in the pollutant emissions during each start-up phase and a synchronization transition in a single operation, therefore a very fast transition, when rephasing is necessary, without this causing any (undesirable) variation in richness.

The invention is not limited to the embodiments of control device and engine control unit described hereinabove purely by way of example, but encompasses all the variants that can be envisaged by those skilled in the art.

The invention claimed is

1. A device (D) for controlling the operation of an internal combustion engine (M) comprising at least two cylinders (Ci) each equipped with at least one inlet valve (SA) and at least one injector (IJ), and of the so-called indirect and sequential fuel injection type, said device (D) comprising detection means (MD) arranged to detect injection event phasing errors relative to reference angular positions specific to the various cylinders (Ci), and control means (MC) arranged to rephase, if a phasing error or phasing errors is or are detected, the command to open the injector (IJ) of said cylinder (Ci) after closure of said inlet valve (SA), characterized in that said control means (MC) are arranged to stop the opening of the injector (IJ) of another cylinder (Ci) when this opening occurs while the new reference angular position of said cylinder (Ci) is being set up.

2. The device as claimed in claim 1, characterized in that said control means (MC) are arranged, during an engine (M) start-up phase, to command the opening of each injector (IJ) once per engine cycle.

3. A unit (UC) for controlling an internal combustion engine (M), characterized in that it comprises a control device (D) as claimed in claim 1.

4. The device as claimed in claim 1, characterized in that said control means (MC) are arranged to generate a new reference angular position of a cylinder (Ci) every 720° after the setting-up of its new reference angular position and after rephasing of at least one of its injection events relative to the latter.

5. The device as claimed in claim 4, characterized in that said control means (MC) are arranged, during an engine (M) start-up phase, to command the opening of each injector (IJ) once per engine cycle.

6. The device as claimed in claim 1, characterized in that said control means (MC) are arranged to determine a new reference angular position for a cylinder (Ci) and set up this new reference angular position when the previous reference angular position of said cylinder (Ci) is passed by exactly 360°, said newly set-up reference angular position then defining the start of a new engine cycle and serving as a reference for phasing the command to open the injector (IJ) of the cylinder (Ci) in said new cycle.

7. The device as claimed in claim 6, characterized in that said control means (MC) are arranged to generate a new reference angular position of a cylinder (Ci) every 720° after the setting-up of its new reference angular position and after rephasing of at least one of its injection events relative to the latter.

8. The device as claimed in claim 6, characterized in that said control means (MC) are arranged, during an engine (M) start-up phase, to command the opening of each injector (IJ) once per engine cycle.

9. The device as claimed in claim 6, characterized in that said control means (MC) are arranged to generate a new reference angular position of a cylinder (Ci) every 720° after the setting-up of its new reference angular position and after rephasing of at least one of its injection events relative to the latter.

10. The device as claimed in claim 6, characterized in that said control means (MC) are arranged to set up a new reference angular position cylinder (Ci) after cylinder (Ci').

11. The device as claimed in claim 10, characterized in that said control means (MC) are arranged, during an engine (M) start-up phase, to command the opening of each injector (IJ) once per engine cycle.

* * * * *